United States Patent
Jobert et al.

(10) Patent No.: US 9,847,868 B2
(45) Date of Patent: Dec. 19, 2017

(54) METHOD OF ROUTING SYNCHRONIZATION MESSAGES

(75) Inventors: Sebastien Jobert, San Jose, CA (US); Frédéric Jounay, Lausanne (FR)

(73) Assignee: ORANGE, Paris (FR)

( * ) Notice: Subject to any disclaimer, the term of this patent is extended or adjusted under 35 U.S.C. 154(b) by 999 days.

(21) Appl. No.: 14/234,940

(22) PCT Filed: Jul. 13, 2012

(86) PCT No.: PCT/FR2012/051677
§ 371 (c)(1),
(2), (4) Date: Jun. 9, 2014

(87) PCT Pub. No.: WO2013/014360
PCT Pub. Date: Jan. 31, 2013

(65) Prior Publication Data
US 2014/0294021 A1    Oct. 2, 2014

(30) Foreign Application Priority Data

Jul. 25, 2011    (FR) ...................................... 11 56729

(51) Int. Cl.
*H04J 3/06*       (2006.01)
*H04L 7/00*       (2006.01)
*H04L 12/701*     (2013.01)

(52) U.S. Cl.
CPC .......... *H04L 7/0016* (2013.01); *H04J 3/0667* (2013.01); *H04J 3/0673* (2013.01); *H04L 45/00* (2013.01)

(58) Field of Classification Search
CPC ...... H04L 45/00; H04L 7/0016; H04J 3/0673; H04J 3/0667
See application file for complete search history.

(56) References Cited

U.S. PATENT DOCUMENTS

| 2008/0205296 A1* | 8/2008 | Zhang | H04L 49/354 370/254 |
| 2011/0161701 A1* | 6/2011 | Blixt | H03L 1/026 713/320 |
| 2012/0128011 A1* | 5/2012 | Holmeide | H04L 69/28 370/474 |

FOREIGN PATENT DOCUMENTS

EP    1919127 A1    5/2008

OTHER PUBLICATIONS

International Search Report and Written Opinion dated Sep. 21, 2012 for corresponding International Application No. PCT/FR2012/051677, filed Jul. 13, 2012.

(Continued)

*Primary Examiner* — Lakeram Jangbahadur
(74) *Attorney, Agent, or Firm* — David D. Brush; Westman, Champlin & Koehler, P.A.

(57) ABSTRACT

A method of routing synchronization messages in a packet communication network, in which a packet is routed using a global routing table. A piece of equipment in the network implements the following steps: detecting a packet carrying a synchronization message in a packet stream; determining an output port; emitting a packet carrying the message at the determined output port, the message being modified using a piece of information representing a time of transit in the equipment. A synchronization routing table, which stores at least one association between an input port and at least one output port, is configured in the equipment. When the packet carrying the received message indicates a routing needs to be carried out using the synchronization table, the output port for this packet is determined by the equipment according to an input port on which the packet is received and by reading the synchronization table.

10 Claims, 2 Drawing Sheets

(56) References Cited

OTHER PUBLICATIONS

"IEEE Standard for a Precision Clock Synchronization Protocol for Networked Measurement and Control Systems; IEEE Std 1588-2008 (Revisiion of IEEE Std 1588-2002) Ed—Anonymous" IEEE Standard; IEEE Piscataway, NJ, USA, Jul. 24, 2008 (Jul. 24, 2008), pp. C1-C269, XP017604130.
Hans Weibel, "Technology Update on IEEE 1588: The Second Edition of the High Precision Clock Synchronization Protocol", 2009, pp. 1-8, XP002670903.
French Search Report and Written Opinion dated Mar. 13, 2012 for corresponding French Application No. 1156729, filed Jul. 25, 2011.
English translation of the International Written Opinion dated Sep. 21, 2012 for corresponding International Application No. PCT/FR2012/051677, filed Jul. 13, 2012.

* cited by examiner

METHOD OF ROUTING SYNCHRONIZATION MESSAGES

CROSS-REFERENCE TO RELATED APPLICATIONS

This application is a Section 371 National Stage Application of International Application No. PCT/FR2012/051677, filed Jul. 13, 2012, which is incorporated by reference in its entirety and published as WO 2013/014360 on Jan. 31, 2013, not in English.

FIELD OF THE DISCLOSURE

The invention relates to the field of communication networks, and more particularly to the field of synchronization in these networks.

BACKGROUND OF THE DISCLOSURE

The development of mobile networks gives rise to a new need in terms of synchronization to be provided for the base stations: in addition to common frequency synchronization, the base stations may need common phrase and/or time synchronization, with very restricting exactitude in the order of one microsecond.

When this type of synchronization is delivered by the network, the pieces of equipment in a packet communication network or a transport network need to have hardware functions that are dedicated to transporting a piece of synchronization information, allowing the avoidance of a transfer time variation phenomenon that is principally created by the variable waiting times for the synchronization messages in the buffer memories of the equipment.

Most of the proposed solutions use a time set protocol, such as the PTP protocol, PTP standing for "Precision Time Protocol". Version 2 of this protocol, PTPv2, is defined by the IEEE1588-2008 standard.

In the case of the PTPv2 protocol, two types of hardware medium for the pieces of equipment in the transport network are defined:

"Boundary Clock": a hardware medium for a clock of this type is made of PTP ports, one of which is in a "slave" state and the others are in a "master state". A synchronization reference is obtained from synchronization messages that are received on a "slave" PTP port and is kept locally to the equipment. This synchronization reference is redistributed to other pieces of equipment: new synchronization packets are generated and sent from "master" PTP ports.

"Transparent Clock": the packets carrying synchronization messages are routed like the other traffic packets through the equipment of the transport network, but the transit time for some of these packets carrying the synchronization messages through the equipment, called the "residence time", is determined precisely and is conveyed by modifying the packet carrying the synchronization message at the output of the equipment. In practice, the sum of the "residence times" is indicated in a particular field of the PTPv2 synchronization message, called the "correction field", and allows the recipient equipment to determine the variation in the transfer time from the timestamps contained in the PTPv2 synchronization message. The PTPv2 synchronization message can thus be processed as if it had not undergone a transfer time variation through the pieces of equipment of the network.

The synchronization messages are sent by a master PTP port on a piece of equipment in the network to a slave PTP port on another piece of equipment in the network. The steps below are implemented on a piece of intermediate equipment in the network, having a hardware medium for a PTP of "Transparent Clock" type:

detection of a PTPv2 synchronization message in a packet stream received on an activated PTPv2 port and timestamping of the packet at the instant of arrival;

routing of the packet carrying the PTPv2 synchronization message, that is to say reading of the header of the packet in order to determine the output port(s) to which the packet needs to be routed. In this case, it is emphasized that it is routed like the other received packets, that is to say by using the packet transfer mode supported by the equipment;

for each determined output port, modification of the "correction field" field in the payload of the packet carrying the synchronization message in order to add thereto the transit time "residence time" measured from the instants of arrival and of sending of the packet followed by sending of the modified packet to the output port.

The synchronization messages can be transmitted in multicast mode or else in point-to-point (unicast) mode with an indication of the address of the slave PTP port in the transport network. This type of hardware medium for PTP nevertheless has a certain number of disadvantages.

The intermediate equipment needs to modify the <<correction field>> field directly in the payload of the packet carrying the PTPv2 synchronization message even though it is not the recipient of this packet. It thus intervenes beyond the layers that it needs to process in order to route the packet. This action corresponds to a layer violation at protocol level.

Moreover, the intermediate equipment needs to be capable of determining the location in this payload of the field to be modified, which in some cases, for example when there is intermediate encapsulation for routing the packet, is not immediate. It is thus necessary to indicate the type of encapsulation used to said intermediate equipment by means of configuration.

It is likewise emphasized that, for some interchanges, the paths followed by the PTPv2 synchronization messages in the downward direction from the master PTP port to the slave PTP port and in the upward direction must be identical so as not to introduce an imbalance which is restricting in an operational network.

SUMMARY

According to a first aspect, the object of the invention is a method for routing synchronization messages in a packet communication network, comprising the following steps implemented by a piece of equipment in the network:

detection of a packet carrying a synchronization message in a packet stream;

determination of at least one output port;

sending of a packet carrying the synchronization message to the determined output port, the synchronization message being modified using a piece of information that is representative of a transit time for said equipment.

The method is remarkable in that it furthermore comprises a step of configuration of a synchronization routing table that stores at least one association between an input port and at least one output port, and, when the packet carrying the received synchronization message indicates that local routing needs to be carried out, the output port for this packet is determined on the basis of an input port on which the packet is received and by reading the synchronization routing table.

At this juncture, it will be recalled that the described method of processing the synchronization messages corresponds to that implemented by a piece of equipment having a "Transparent Clock".

The packets in the communication network are routed by means of a routing table, referred to as a global routing table.

The synchronization routing table is defined locally to the intermediate equipment. Local routing is understood here to mean routing by means of the synchronization routing table. The latter is dedicated to routing synchronization messages that indicate that local routing needs to be carried out and only for said messages. The other synchronization messages, which do not indicate that local routing needs to be carried out, are routed on the basis of the information contained in the header of the packet carrying them and a global routing table in the equipment, said table being dedicated to routing in the packet communication network. These other synchronization messages are transported in the packet communication network while indicating the address of the slave PTP port or else that of the master PTP port.

Thus, for these synchronization messages indicating that local routing needs to be carried out, which are transmitted from a master PTP port to one or more slave PTP ports, one of the advantages of the multicast mode over a point-to-point mode is kept. The reason is that the master PTP port does not need to know an address for a slave PTP port in order to send the synchronization message. According to the invention, it requires only that the packet carrying the synchronization message indicate that local routing needs to be carried out. The operation and the configuration of the equipment integrating the master PTP port remain simple as for the multicast mode.

Moreover, a PTP synchronization message indicating that local routing needs to be carried out, which message is sent from a slave PTP port to the master PTP port, will likewise be routed by the synchronization routing table. By configuring this table, a point-to-point mode is involved. The slave PTP port does not need to know the packet communication network address of the master PTP port. The synchronization message is thus transmitted step by step and routed by a decision that is local to each piece of equipment traversed. By definition, this local decision is independent of an end-to-end architecture and therefore does not require a piece of equipment having a master PTP port to have the same method of routing packets on the same OSI layer as a piece of equipment having a slave PTP port and vice versa.

Thus, a bidirectional multicast tree is constructed, allowing the slave PTP ports to reply to the master PTP port and only to the latter, and guaranteeing that the messages use the same paths in both directions.

The synchronization message received is intended for the intermediate equipment by virtue of the indication that local routing needs to be carried out. The new synchronization message(s) sent is/are itself/themselves generated from the received synchronization message, modifying it beforehand notably in order to add the measured transit time to the "correction field". There is no longer a layer violation in relation to the conventional operation of a clock of "Transparent Clock" type. The implementation at the level of a piece of equipment is likewise simplified, since the position of the PTP payload is known.

The method allows the avoidance of the complex setup of a transfer plan that is dedicated to synchronization in the packet communication network by replacing this operation with a configuration that is local to each piece of network equipment. It likewise allows a synchronization network that mixes clocks of "Transparent Clock" type and clocks of "Boundary Clock" type to be deployed.

According to one particular feature of the method, a local address for the synchronization protocol, which address is included in the packet carrying the received synchronization message, indicates that local routing needs to be carried out.

A local address for the synchronization protocol can be used to indicate that local routing needs to be carried out. By way of example, it is a local multicast MAC address 01-80-C2-00-00-0E reserved for the PTPv2 protocol. No knowledge of the address of the neighboring equipment is required. The new synchronization message is sent directly to the output port(s) determined from the local synchronization routing table.

A piece of intermediate equipment receiving the synchronization message but not implementing the PTPv2 protocol will not be able to process the packet when local addressing is used, and the packet is therefore destroyed. This avoids the propagation of a synchronization message through a piece of equipment that does not provide any medium for PTPv2. Such a synchronization message would in fact bring about a significant synchronization error on the slave PTP port.

According to another particular feature, since the received synchronization message carries a piece of information relating to a synchronization domain, the output port is furthermore determined on the basis of said information.

The synchronization domain corresponds to a set of pieces of equipment that have their clocks synchronized to one another. The intermediate equipment needs to route the synchronization message differently on the basis of the synchronization domain.

The local routing table in this case comprises routing on the basis of the synchronization domain. This allows setup, if necessary, of the different synchronization broadcast topologies (for example for different applications) going through the same pieces of network equipment.

In another embodiment, the synchronization domain is not taken into account for implementing the routing. It will be recalled that in this case the slave PTP port does not process synchronization messages that indicate a synchronization domain other than the one to which it belongs.

According to another particular feature, a synchronization message requiring a delay measurement carries an address for the equipment sending the message and a piece of equipment processing the message obtains the address of the sending equipment from the message in order to send a response synchronization message to the address of the sender.

According to another particular feature, a piece of equipment receiving a synchronization message requiring a delay measurement obtains the address of the sending equipment from the header of the packet carrying said message in order to send a response synchronization message to the address of the sender.

According to another particular feature, the intermediate equipment receives a synchronization message requiring a delay measurement, extracts a PTP identifier and a sequence number from the received message and stores an identifier for the port that is used to receive the message in association with the PTP identifier and the sequence number that have been extracted, in order to subsequently route a response synchronization message comprising the PTP identifier and the sequence number to the port stored in association.

According to a second aspect, the invention concerns a piece of equipment for routing synchronization messages in a packet communication network, comprising:

means for detecting a packet carrying a synchronization message in a packet stream;
means for determining an output port;
means for modifying the synchronization message using a piece of information that is representative of a transit time for said equipment;
means for sending a packet carrying the modified synchronization message to the determined output port, characterized in that the equipment furthermore comprises means for configuring a synchronization routing table that stores an association between an input port and at least one output port, verification means that are designed to verify that the packet carrying the received synchronization message indicates that routing by means of the synchronization routing table needs to be carried out and in that the determination means are furthermore designed to determine the output port for said packet on the basis of an input port on which the packet is received and by reading the synchronization routing table.

According to a third aspect, the invention concerns a system for routing synchronization messages comprising at least one piece of equipment according to the second aspect and a piece of equipment that is designed to send a packet carrying a synchronization message and indicating that local routing needs to be carried out.

According to one particular feature, the system furthermore comprises pieces of equipment having a hardware medium of "Boundary Clock" type that is defined in the PTPv2 standard.

According to a fourth aspect, the invention likewise concerns a computer program having instructions for implementing the method for routing synchronization messages according to the first aspect, said instructions being implemented by a piece of equipment, when said program is executed by a processor.

BRIEF DESCRIPTION OF THE DRAWINGS

The invention will be better understood with the aid of the description below of the particular embodiments of the system of the invention, with reference to the appended drawings, in which.

DETAILED DESCRIPTION OF ILLUSTRATIVE EMBODIMENTS

Figure 1:
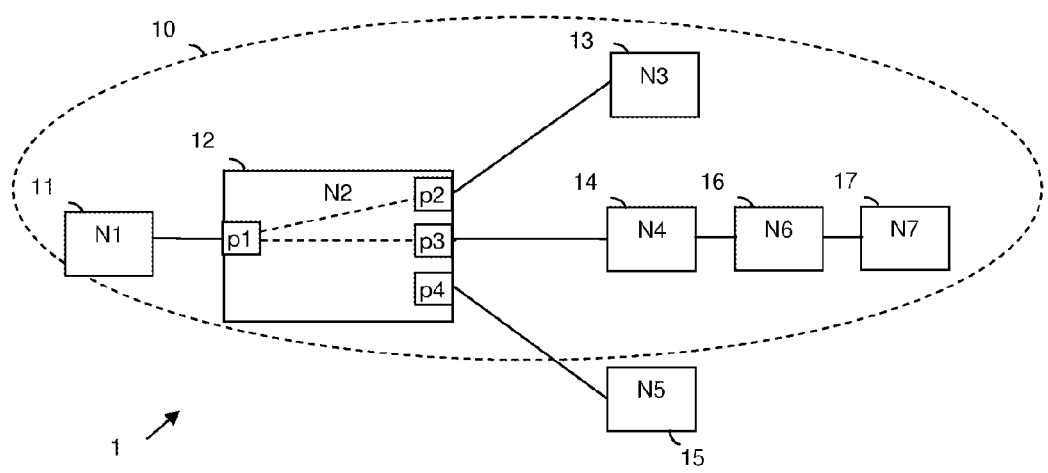
FIG. 1 shows a system for routing synchronization messages in a packet communication network.

FIG. 1 shows a system 10 for routing synchronization messages in a packet communication network 1. The packet communication network 1 is an IP network or an MPLS label switching network, MPLS standing for "Multi-Protocol Label Switching", or else an Ethernet, for example. It comprises pieces of routing equipment, some 11-17 of which are shown in FIG. 1, which are designed to route packets in the network. Such a piece of routing equipment 11-17 comprises input/output ports that are designed to receive and send packets. It will be recalled at this juncture that a packet to be routed in the packet communication network comprises a destination address notably in a header. The routing equipment 12, 14, 16 comprises a global routing table 108, shown in FIG. 3, that associates an output port with a destination address. Thus, on receiving a packet, the routing equipment 12, 14, 16 verifies whether the received packet is intended for it, and if this is not the case it uses the destination address of the received packet and the global routing table 108 to determine the output port for the packet. The routing equipment sends the packet to the determined output port. This global routing table 108 is configured on the basis of known procedures, for example using protocol message interchange, and is not described more precisely here. In an MPLS label switching network, the routing equipment 12, 14, 16 comprises a global routing table that associates an output label and an output port with an input label.

Subsequently, the particular case of the distribution of synchronization using synchronization messages that are compliant with the PTPv2 protocol will be considered. A PTPv2 synchronization message is carried by a packet that is routed in the packet communication network. The system 10 for routing synchronization messages comprises a set of pieces of equipment 11-14, 16-17 that belong to one and the same synchronization domain. A synchronization domain allows a plurality of clocks that are synchronized to one another to be identified.

The equipment 11 is a piece of master equipment, that is to say that it is designed to distribute synchronization to pieces of slave equipment in the synchronization domain, two of which 13 and 17 are shown in FIG. 1. By way of example, the master equipment comprises a clock of "Ordinary Clock" type that acts as a main master ("Grandmaster") clock or else a clock of "Boundary Clock" type that has all of its ports in a "master" state. By way of example, the pieces of slave equipment correspond to "Slave Only Ordinary Clock" clocks. The synchronization messages between the master equipment 11 and the slave equipment 13 travel via the equipment 12. The synchronization messages between the master equipment 11 and the slave equipment 17 travel via pieces of equipment 12, 14, 16. The equipment 15 does not belong to the synchronization domain and, by way of example, uses a local clock for its operation. There is no restriction attached to the number of pieces of master equipment, either to that for slave equipment or to that for intermediate equipment.

In one particular embodiment, the pieces of intermediate equipment 12, 14, 16 have a hardware medium for the PTPv2 protocol of "Transparent Clock" type.

It will be recalled at this juncture that in a clock of "Transparent Clock" type a received PTP synchronization message is timestamped using the instant of arrival and then is routed in the equipment to one or more output port(s). Prior to sending, the equipment determines a transit time from the instant of arrival and from the instant of sending of each message and modifies a field called "Correction Field" in the payload of the initial packet carrying the PTPv2 synchronization message, just before said packet is sent to the output port.

Subsequently, the intermediate equipment 12 will be considered. According to the invention, the input/output ports of this intermediate equipment 12 are configured for the PTPv2 protocol. A port may be in three activation states for this protocol.

A first, "deactivated" state is associated with a port on which any received PTPv2 synchronization messages are ignored.

A second, "activated, upstream" state is associated with a port on which PTPv2 synchronization messages sent by a master PTP port, either directly or via a piece of intermediate equipment, are likely to be received. An "activated, upstream" port is connected directly or indirectly to a port of the master equipment or else to a master PTP port of a piece of equipment having a PTPv2 medium of "Boundary Clock" type, which is presented in the introductory part of the application. An "activated, upstream" port does not have to be connected to a slave PTP port or else to another port configured as "activated, upstream".

A third, "activated, downstream" state is associated with a port on which PTPv2 synchronization messages sent by a slave PTP port, directly or indirectly, are likely to be received. An "activated, downstream" port needs to be connected directly or indirectly to a PTPv2 slave port as defined in this protocol, that is to say to the port of a "Slave-Only Ordinary Clock" clock or to the slave PTP port of a piece of equipment implementing the PTPv2 medium of "Boundary Clock" type. An "activated, downstream" port does not have to be connected to a master PTP port, as defined in this protocol, that is to say either a "GrandMaster" or a master PTP port of a piece of equipment having a PTPv2 medium of "Boundary Clock" type. Nor does it have to be connected to another PTPv2 port in the third, "activated, downstream" state.

Figure 3:
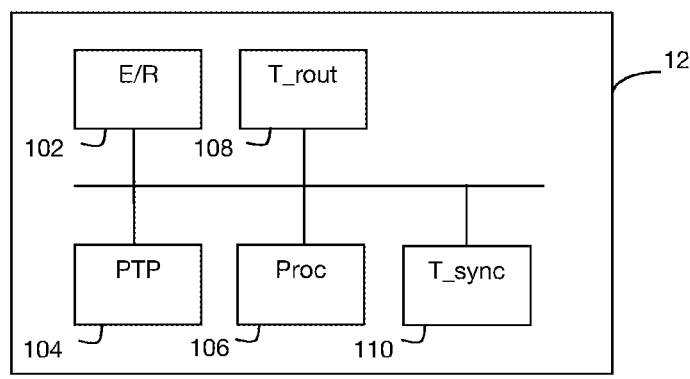
FIG. 3 shows a piece of equipment in the communication network in a particular embodiment of the invention.

According to the invention, a synchronization routing table 110, shown in FIG. 3, stores an association between an "activated, upstream" port and one or more "activated, downstream" ports.

The following rules must be observed for these associations:
- a port in the second "activated, upstream" state is associated with one or more other ports in the third, "activated, downstream" state;
- a port in the second, "activated, upstream" state cannot be associated with another port in the second "activated, upstream" state;
- a port in the third, "activated, downstream" state is associated with one and a single other port in the second "activated, upstream" state;
- a port in the third, "activated, downstream" state cannot be associated with another port in the third, "activated, downstream" state.

Thus, the intermediate equipment 12, as shown in FIG. 1, comprises four PTPv2 ports denoted by p1, p2, p3, p4:
- the port p1 is "activated, upstream" and is connected to the master equipment 11;
- the ports p2 and p3 are in the third, "activated, downstream" state and are connected to the slave equipment 13 and intermediate equipment 14, respectively;
- the port p4 is in the first, "deactivated" state.

The synchronization routing table 110 stores:
- the states of the various ports p1, p2, p3, p4, notably the state of the port p4 "deactivated" and the states of the ports p1, p2, p3 "activated", and
- an association between the port p1 in the second, "activated, upstream" state and the ports p2 and p3 in the third, "activated, downstream" state.

Thus, when a PTPv2 synchronization message indicating that local routing needs to be carried out is received on the port p1, the latter is a PTPv2 input port and the ports p2 and p3 are the associated PTPv2 output ports. Conversely, when a PTPv2 synchronization message indicating that local routing needs to be carried out is received on the port p2, the latter is a PTPv2 input port and a port p1 is the associated PTPv2 output port; when a PTPv2 synchronization message is received on the port p3, the latter is a PTPv2 input port and the port p1 is the associated output port. A PTPv2 synchronization message received on the port p4 is ignored.

Figure 2:
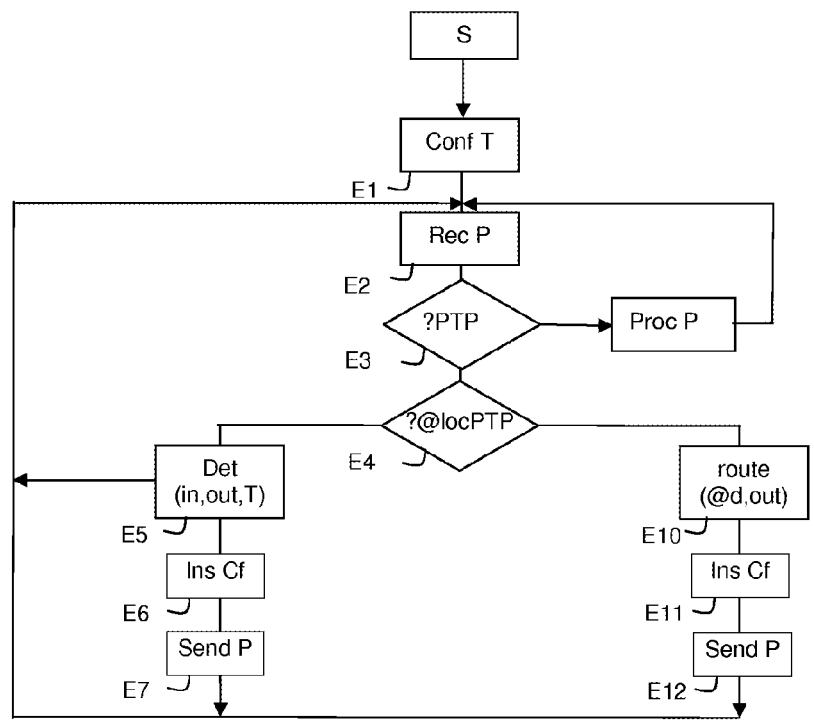
FIG. 2 shows the steps of a method for routing synchronization messages that is implemented in a piece of equipment in the communication network according to a particular embodiment of the invention.

The method for routing synchronization messages as implemented in the equipment 12 of the packet communication network will now be described with reference to FIG. 2.

In a configuration step E1, the synchronization routing table 110 as described above is configured. At the conclusion of this configuration step E1, said table thus stores one or more associations between an "activated, upstream" port and at least one "activated, downstream" port, that is to say between an input port and at least one output port. By way of example, it is configured by local maintenance procedures or else by means of a network administrator. There is no restriction attached to the manner of configuring this synchronization routing table.

In a step E2, the equipment 12 awaits reception of a packet on one of its input/output ports.

In a step E3, the equipment 12 then verifies whether the received packet carries a PTPv2 synchronization message. The case in which a packet that does not carry a synchronization message is received is not described here. The processing of such a packet is not covered by the present application. The packet carrying the synchronization message is thus detected in a received packet stream.

In a step E4, the equipment 12 then verifies whether the packet carrying the received PTPv2 synchronization message indicates that local routing of the packet needs to be carried out. More precisely in the embodiment described, local routing needs to be carried out when the received packet carrying the PTPv2 synchronization message comprises as destination address an address that is defined as local for the PTP protocol. By way of example, this is a local multicast MAC address 01-80-C2-00-00-0E reserved for the PTPv2 protocol. In another embodiment, local routing needs to be carried out when the packet has the address of the equipment 12 itself as destination address. In yet another embodiment, local routing needs to be carried out when a given field of the synchronization message carries this indication. In an MPLS label switching network, local routing needs to be carried out when the input label corresponds to a given label.

If the packet carrying the received PTPv2 synchronization message does not indicate that local routing needs to be carried out, then, in a step E10, the equipment 12 timestamps the PTPv2 synchronization message at the instant of arrival and determines the output port from the global routing table 108. In a communication network of IP type, the destination address of the packet is taken into account in order to determine the routing of the packet. In a label switching network of MPLS type, the input label is taken into account in order to determine the routing of the packet.

Just before the packet carrying the PTPv2 synchronization message is sent, in a step E11, the equipment 12 determines an instant of sending, determines a transit time in the equipment 12 from the instants of arrival and sending and modifies the "Correction Field" field of the synchronization message included in the payload of the packet carrying the PTPv2 synchronization message. The PTPv2 synchronization message is thus modified using a piece of information that is representative of a transit time for the equipment 12. This is the conventional processing of a synchronization message of "Event" type, such as "Sync" and "Delay_Request" messages, implemented by a piece of equipment comprising a hardware medium of "Transparent Clock" type. At this juncture, it is emphasized that it is likewise possible to transmit the "Correction Field" field in a "Follow Up" synchronization message. Moreover, for some PTP synchronization messages, for example the "Delay_Response" synchronization message, in accordance with the PTP standard, and in some implementations, the equipment 12 does not determine the transit time and does not modify the synchronization message before sending.

In a step E12, the packet carrying the modified synchronization message is sent to the output port determined in step E10.

The method for routing synchronization messages then returns to step E2, awaiting reception of a packet.

If in step E4 it is determined that the packet carrying the received PTPv2 synchronization message indicates that local routing needs to be carried out, then, in a step E5, the equipment 12 determines, for the port on which the packet has been received, called the input port, whether the PTPv2 synchronization message needs to be routed.

If the input port is in the first, "deactivated" state, the PTPv2 synchronization message is not processed and the method for routing synchronization message returns to step E2, awaiting reception of a new packet.

In the opposite case, the equipment 12 determines one or more output ports from the synchronization routing table 110. By way of example, if the packet has been received on the port p1, ports p2 and p3 are determined as output ports; if the packet has been received on the port p2, the port p1 is defined as output port.

The method for routing synchronization messages then implements a step E6 in the course of which the PTPv2 synchronization message is modified using the transit time to the equipment 12 in order to update the "correctionField" field.

The method for routing synchronization messages then implements a step E7. A packet carrying the modified PTPv2 synchronization message is put together with an indication that local routing needs to be carried out and is then sent to the output port determined in step E5. At this juncture, it is emphasized that is likewise possible to transmit the "Correction Field" field in a "Follow Up" synchronization message.

These steps E6 and E7 are implemented for each of the output ports determined when the synchronization routing table 110 is read.

The method for routing synchronization messages then returns to step E2, awaiting reception of a packet.

Thus, by virtue of the synchronization routing table 110, the local routing of the PTPv2 synchronization messages is as follows:
- a PTPv2 synchronization message received on a port in the first, "deactivated" state is ignored. No synchronization message is sent at the output of the equipment;
- a PTPv2 synchronization message received on a port in a second, "activated, upstream" state is resent, following modification, to one or more associated ports in the third, "activated, downstream" state. One or more PTPv2 synchronization messages are sent at the output of the equipment following modification for each associated port in accordance with the operation of a clock of "Transparent Clock" type;
- a PTPv2 synchronization message received on a port in the third, "activated, downstream" state is resent, following modification, to the associated port in the second, "activated, upstream" state. A single PTPv2 synchronization message is sent at the output of the equipment following modification in accordance with the operation of a clock of "Transparent Clock" type.

The method for routing synchronization messages, as described in the branch of said method that comprises steps E5, E6 and E7, thus complies with the organization into protocol layers since the equipment implementing these steps is the recipient of the PTPv2 messages. Moreover, the position of the PTP payload is known in advance. A specific transfer plan for the synchronization messages is thus created. There is likewise a guarantee that the PTPv2 synchronization messages in the downward direction and in the upward direction follow the same path.

At this juncture, it is emphasized that no modification is made as regards the manner in which the content of the PTPv2 synchronization messages is processed. The processing in fact complies with that defined for a clock of "Transparent Clock" type.

The method for routing synchronization messages may advantageously be implemented during interchange of PTPv2 synchronization messages between a master PTP port and a slave PTP port. A first PTPv2 synchronization message "Sync" is sent by the master PTP port. In one particular embodiment, the slave PTP port then sends a second PTPv2 synchronization message "Delay_Request", requiring a delay measurement, to the master PTP port. In response to this second PTPv2 synchronization message, the master PTP port sends the slave PTP port a third PTPv2 message "Delay_Response" in response. From the instant of the first PTPv2 message being sent, from the instant of said message being received, from the instant of the second PTPv2 message being sent and from the instant of said message being received by the master PTP port, and from the transit time for the synchronization messages that is indicated in the "correction field" field, the slave PTP port is then able to correct its clock.

The three PTPv2 synchronization messages "Sync", "Delay_Request", "Delay_Response" can be transmitted with an indication that local routing needs to be carried out. In the particular case in which the synchronization routing table associates a plurality of "activated, downstream" ports with an "activated, upstream" port, the first PTPv2 synchronization message "Sync" is transmitted, once modified, to a plurality of slave PTP ports. Each of these will in return send a second synchronization message "Delay_Request", defined in table 26 of the IEEE 1588-2008 standard. This second synchronization message will only be transmitted to the master PTP port by virtue of the local routing table. Moreover, the PTP header of this second message comprises a "sourcePortIdentity" field (table 18 of the standard). The master PTP port will respond with a third PTPv2 synchronization message "Delay_Response" for each second message received. The third PTPv2 synchronization message comprises a "requestingPortIdentity" field that is copied by the master PTP port from the "sourcePortIdentity" field received in the second message "Delay_Request". If these third messages are sent with an indication that a local routing needs to be carried out, slave PTP ports will receive one or more third message(s) that is/are not intended for them. At this juncture, it will be recalled that, in accordance with the standard, such slave PTP ports will ignore these third messages that are not intended for them by virtue of the "requestingPortIdentity" field.

The slave PTP port to which the third message "Delay_Response" is sent processes the third message in accordance with the standard. This embodiment operates whatever the types of communication networks situated between the master PTP port and the slave PTP port.

In another embodiment, the master PTP port may likewise learn from the packet carrying the second synchronization message "Delay_Request" the network address of the slave PTP port that has sent this second PTPv2 message. It can notably obtain this address from the header of the packet. In this case, the third message "Delay_Response" is sent in point-to-point mode with an indication of the destination address of the slave PTP port, and not with an indication that local routing needs to be carried out. It is routed conventionally by a piece of intermediate equipment, implementing steps E10 to E12 described above, using the global routing table 108. This embodiment operates when the equipment comprising the master PTP port communicates with the equipment comprising the slave PTP port on one and the same OSI transfer layer, such as Ethernet or IP.

In yet another embodiment, the slave PTP port indicates its own address in a new "sourceAddress" field of the second synchronization message "Delay_Request". Thus, the master PTP port obtains the address of the slave PTP port by reading the second synchronization message "Delay_Request" and transmits the third synchronization message "Delay_Response" only to said slave PTP port. This embodiment operates when the equipment comprising the master PTP port communicates with the equipment comprising the slave PTP port on one and the same OSI transfer layer, such as Ethernet or else IP.

In yet another embodiment, the slave PTP port sends the second synchronization message "Delay_Request" with an indication that local routing needs to be carried out. When a synchronization message "Delay_Request" is received by a piece of intermediate equipment comprising a PTP hardware medium of "Transparent Clock" type in accordance with the invention, said piece of equipment extracts from the received message a PTP identifier for the PTP port, indicated in the "sourcePortIdentity" field of the message and a sequence number, indicated in the "sequenceId" field of the message, and uses a dynamic routing table to store an identifier for the port by means of which the message is received, in association with the PTP identifier and the sequence number that have been extracted. The intermediate equipment routes the "Delay_Request" message by using the synchronization routing table. Once the "Delay_Request" message has been received, the master PTP port sends a third synchronization message "Delay_Response" with an indication that local routing needs to be carried out. In accordance with the standard, the master PTP port copies the "sourcePortIdentity" field of the "Delay_Request" message to the "requestingPortIdentity" field of the "Delay_Response" message; the master PTP port copies the "sequenceId" field of the "Delay_Request" message to the "sequenceId" field of the "Delay_Response" message. When a "Delay_Response" message is received, the intermediate equipment obtains from the "Delay_Response" message the PTP identifier and the sequence number and determines the output port associated with these. The output port thus corresponds to that by means of which the "Delay_Request" message has been received previously. The intermediate equipment therefore uses not the synchronization routing table in order to process the "Delay_Response" message but rather the dynamic routing table constructed by the intermediate equipment from the "Delay_Request" messages received. If no port has been found for routing the "Delay_Response" message in the dynamic routing table, said message is either erased or is optionally routed according to the synchronization routing table. The information stored by the intermediate equipment in the dynamic routing table following reception of a "Delay_Request" message is kept for a predetermined period. This period must be sufficient to guarantee that the "Delay_Response" message has been returned by the master PTP port. It is in the order of few seconds. This embodiment operates independently of the method of global routing for the packets that is supported by the equipment having the master PTP port, the equivalent having the slave PTP port and the pieces of intermediate equipment.

In a variant for these various embodiments, the synchronization routing table 110 comprises, for each stored association, a piece of information that relates to a synchronization domain in which this association is valid. A synchronization domain allows a plurality of clocks that are synchronized to one another to be identified.

Thus, during step E5, the equipment 12 obtains from the received PTPv2 synchronization message the "domainNumber" conveyed in the header of the PTPv2 messages. Thus, the output port(s) is/are determined from the domain number and from the input port. This allows the provision of different routing for the PTPv2 synchronization messages on the basis of the synchronization domain.

It is likewise possible to provide one synchronization routing table per synchronization domain.

This allows setup, if necessary, of different synchronization broadcast topologies (for example for different applications) going through the same pieces of equipment in the network.

A piece of equipment 12 in the synchronization message routing system 10 is shown in FIG. 3 according to a particular embodiment of the invention.

The equipment 12 comprises:
the global routing table 108 described above;
the synchronization routing table 110 described above;
a transmission/reception module 102 that is designed to send and receive packets;
a PTP module 104 that is designed to implement the PTPv2 protocol;
a processing module 106.

The processing module 106 is notably designed to:
configure the synchronization routing table 110;
detect whether a packet carrying a synchronization message received by the transmission/reception module 102 indicates that local routing needs to be carried out;
route a received packet to an output port on the basis of the global routing table 108 when the received packet does not indicate that local routing needs to be carried out;
route a received packet to an output port on the basis of the synchronization routing table 110 when the received packet indicates that local routing needs to be carried out and carries a synchronization message.

The PTP module 104 determines the transit time for the received packet and modifies the "correction field" field of the synchronization message as described above.

The modified packet is then sent by the transmission/reception module 102 to the output port with an indication that local routing needs to be carried out.

In a particular embodiment, the intermediate equipment 12 comprises a dynamic routing table, not shown in FIG. 3, which is designed to store an association between a port by means of which a "Delay_Response" message is received, a PTP identifier and a sequence number. In this embodiment, the processing module 106 is designed to store the association in the dynamic routing table upon receipt of a "Delay_request" message and to route a "Delay_Response" message on the basis of the dynamic routing table as described above.

The pieces of equipment 14, 16 comprise means similar to those of the equipment 12, which is described with reference to FIG. 3.

The equipment 11, which incorporates a master PTP port, notably comprises:
- a transmission/reception module that is designed to send and receive packets;
- a PTP module that is designed to implement the PTPv2 protocol;
- a processing module.

The processing module of the equipment 11 is notably designed to transmit packets carrying synchronization messages indicating that local routing needs to be carried out.

In one particular embodiment, the processing module of the equipment 11 is furthermore designed to obtain a network address for a piece of equipment incorporating a slave PTP port.

A piece of equipment 13, 17, incorporating a slave PTP port, notably comprises:
- a transmission/reception module that is designed to send and receive packets;
- a PTP module that is designed to implement the PTPv2 protocol;
- a processing module.

The processing module of the equipment 13, 17 is notably designed to transmit packets carrying synchronization messages indicating that local routing needs to be carried out.

In one particular embodiment, the processing module of the equipment 13, 17 is designed to insert its own address into a "sourceAddress" field of a "Delay_Request" message.

The respective processing modules of the pieces of equipment 11-14, 16-17 are designed to implement those of the steps of the method for routing synchronization messages that has been described above that are executed by the equipment. There are preferably software modules comprising software instructions for executing those of the steps of the method for routing synchronization messages that has been described above that are implemented by a piece of equipment in the packet communication network. The invention therefore also concerns:
- a program for equipment, comprising program instructions that are intended to control the execution of the steps of the method for routing synchronization messages that has been described above that are executed by said equipment when said program is executed by a processor thereof;
- a recording medium that can be read by a piece of equipment on which the program for equipment is recorded.

The software modules can be stored in or transmitted by a data storage medium. The latter may be a hardware storage medium, for example a CD-ROM, a magnetic floppy disc or a hard disc, or else a transmission medium such as an electrical, optical or radio signal or a telecommunication network.

In the embodiments described, the routing system 10 for synchronization messages comprises a plurality of pieces of equipment, including:
- a piece of equipment 11, comprising a master PTP port, which is cable of synchronizing a plurality of pieces of equipment 13, 17 incorporating a slave PTP port;
- pieces of intermediate equipment 12, 14, 16 as described above that are capable of processing PTPv2 synchronization messages, having a hardware medium of "Transparent Clock" type according to the invention.

In another embodiment, the routing system 10 for synchronization messages may comprise one or more pieces of intermediate equipment comprising a hardware medium of "Boundary Clock" type. By way of nonlimiting example, these may be the pieces of equipment 14, 16. The reason is that, at the level of such pieces of intermediate equipment 14, 16, the PTPv2 synchronization message "Sync" is processed and allows local synchronization of the clock of the equipment. New packets carrying PTPv2 synchronization messages "Sync" are sent to the master PTP port(s) connecting the intermediate equipment to slave PTP ports on other pieces of equipment.

At this juncture, it is emphasized that, in the event of a design error for the synchronization network, the routing system 10 for synchronization messages may comprise one or more pieces of intermediate equipment that do not support the PTP protocol. On account of the indication that local routing needs to be carried out, a PTPv2 synchronization message will not be routed by such a piece of intermediate equipment to the slave equipment. Thus, the slave equipment does not receive any synchronization messages in this case. In the absence of the indication that local routing needs to be carried out, a synchronization message containing errors would have been received.

The invention thus allows the distribution of a clock exhibiting the required levels of precision, for example for LTE, standing for "Long Term Evolution", mobile networks in TDD ("Time Division Duplex") mode, UMTS mobile networks in TDD mode, W-CDMA ("Wideband Code Division Multiple Access") mobile networks in TDD mode, TD-SCDMA ("Time Division Synchronous Code Division Multiple Access", mobile networks in TDD mode, WiMax mobile networks in TDD mode, digital broadcast techniques such as terrestrial or mobile television (DVB-T, DVB-H), LTE-A (Advanced) mobile networks using the MBSFN ("Multicast Broadcast Multimedia Services in Single Frequency Network mode") mode, or else using the functionalities of CoMP ("Coordinated MultiPoint transmission and reception", also called MIMO networks in some cases).

Although the present disclosure has been described with reference to one or more examples, workers skilled in the art will recognize that changes may be made in form and detail without departing from the scope of the disclosure and/or the appended claims.

The invention claimed is:

1. A method for routing synchronization messages in a packet communication network, in which packets are routed by using a routing table, referred to as a global routing table, implemented by a router in the communication network, said method comprising:
- configuring a synchronization routing table, distinct from the global routing table, that stores at least one association between an input port and at least one output port of the router;
- receiving a packet carrying a destination address and a synchronization message in a packet stream on the input port;
- verifying if the packet carrying the received synchronization message indicates that routing by using the synchronization routing table needs to be carried out;
- when the packet carrying the received synchronization message indicates that routing by using the synchronization routing table needs to be carried out, retrieving, from the synchronization routing table, at least one output port associated with the input port on which the packet carrying the received synchronization message is received and routing the packet carrying the synchronization message to the retrieved output port, the synchronization message being modified using information that is representative of a transit time for said router;

when the packet carrying the received synchronization message does not indicate that routing by using the synchronization routing table needs to be carried out, routing the packet carrying the synchronization message through at least one output port derived from the destination address and the global routing table, wherein the global routing table associates the destination address with the at least one output port of the router.

2. The method as claimed in claim 1, in which the packet carrying the received synchronization message comprises a local address for a synchronization protocol, which indicates that routing by using the synchronization routing table needs to be carried out.

3. The routing method as claimed in claim 1, in which the received synchronization message carries information relating to a synchronization domain and the output port is furthermore determined on the basis of said information.

4. The routing method as claimed in claim 1, in which, when the synchronization message requires a delay measurement, the synchronization message carries an address for equipment sending the synchronization message and wherein the router processing the synchronization message obtains the address of the sending equipment from the synchronization message in order to send a response synchronization message to the address of the sending equipment.

5. The routing method as claimed in claim 1, in which, when the synchronization message requires a delay measurement, the router receiving the synchronization message obtains an address of equipment sending the synchronization message from a header of the packet carrying the synchronization message in order to send a response synchronization message to the address of the sending equipment.

6. The routing method as claimed in claim 1, in which, when the synchronization message requires a delay measurement, the router extracts a PTP identifier and a sequence number from the received synchronization message and stores an identifier for the input port that is used to receive the synchronization message in association with the PTP identifier and the sequence number that have been extracted, in order to subsequently route a response synchronization message comprising the PTP identifier and the sequence number to the output port stored in association.

7. A router for routing synchronization messages in a packet communication network, in which packets are routed by using a routing table, referred to as a global routing table, comprising:
a non-transitory computer-readable medium comprising instructions stored thereon; and
a processing unit, which communicates with the non-transitory computer-readable medium and executes the stored instructions to:
configure a synchronization routing table that stores an association between an input port and at least one output port,
receive a packet carrying a destination address and a synchronization message in a packet stream on the input port;
verify that the packet carrying the received synchronization message indicates that routing by using the synchronization routing table needs to be carried out;
when the packet carrying the received synchronization message indicates that routing by using the synchronization routing table needs to be carried out, retrieve, from the synchronization routing table, at least one output port associated with the input port on which the packet carrying the received synchronization message is received and route the packet carrying the synchronization message to the retrieved output port, the synchronization message being modified using information that is representative of a transit time for said equipment;
when the packet carrying the received synchronization message does not indicate that routing by using the synchronization routing table needs to be carried out, route the packet carrying a synchronization message through at least one output port derived from the destination address and the global routing table, wherein the global routing table associates the destination address with the at least one output port of the router.

8. A system for routing synchronization messages in a packet communication network, in which packets are routed by using a routing table, referred to as a global routing table, the system comprising at least one first router comprising:
a non-transitory computer-readable medium comprising instructions stored thereon; and
a processing unit, which communicates with the non-transitory computer-readable medium and executes the stored instructions to:
configure a synchronization routing table that stores an association between an input port and at least one output port,
receive a packet carrying a destination address and a synchronization message in a packet stream on the input port;
verify that the packet carrying the received synchronization message indicates that routing by using the synchronization routing table needs to be carried out;
when the packet carrying the received synchronization message indicates that routing by using the synchronization routing table needs to be carried out, retrieve, from the synchronization routing table, at least one output port associated with the input port on which the packet carrying the received synchronization message is received and route the packet carrying the synchronization message to the retrieved output port, the synchronization message being modified using information that is representative of a transit time for said equipment;
when the packet carrying the received synchronization message does not indicate that routing by using the synchronization routing table needs to be carried out, route the packet carrying a synchronization message through at least one output port derived from the destination address and the global routing table, wherein the global routing table associates the destination address with the at least one output port of the router; and
wherein the system further comprises;
a second router that is configured to send the packet carrying the synchronization message and indicating that routing by using the synchronization routing table needs to be carried out.

9. The routing system as claimed in claim 8, wherein the first router and second router have a hardware medium of a "Boundary Clock" type that is defined in the PTPv2 standard.

10. A non-transitory computer-readable medium comprising a computer program stored thereon and having instructions for implementing a method for routing synchronization messages in a packet communication network, in which packets are routed by using a routing table, referred to as a global routing table, the instructions being implemented by a router in the packet communication network, wherein, the program is executed by a processor of the router, which communicates with the non-transitory computer-readable medium and executes the stored instructions to:

configure a synchronization routing table that stores an association between an input port and at least one output port, receive a packet carrying a destination address and a synchronization message in a packet stream on the input port;

verify that the packet carrying the received synchronization message indicates that routing by using the synchronization routing table needs to be carried out;

when the packet carrying the received synchronization message indicates that routing by using the synchronization routing table needs to be carried out, retrieve, from the synchronization routing table, at least one output port associated with the input port on which the packet carrying the received synchronization message is received and route the packet carrying the synchronization message to the retrieved output port, the synchronization message being modified using information that is representative of a transit time for said equipment;

when the packet carrying the received synchronization message does not indicate that routing by using the synchronization routing table needs to be carried out, route the packet carrying a synchronization message through at least one output port derived from the destination address and the global routing table, wherein the global routing table associates the destination address with the at least one output port of the router.

* * * * *